United States Patent [19]

Verlaeten et al.

[11] 4,428,918
[45] Jan. 31, 1984

[54] PROCESS AND PLANT FOR THE PREPARATION OF CONCENTRATED AQUEOUS SOLUTIONS OF ALKALI METAL HYPOCHLORITE

[75] Inventors: Jean Verlaeten, Brussels; Jacques Brahm, Grimbergen, both of Belgium

[73] Assignee: Solvay & Cie., Brussels, Belgium

[21] Appl. No.: 326,273

[22] Filed: Dec. 1, 1981

[30] Foreign Application Priority Data

Dec. 22, 1980 [FR] France .................... 80 27409

[51] Int. Cl.³ .................................. C01B 11/04
[52] U.S. Cl. ........................ 423/473; 422/147; 422/226
[58] Field of Search ............ 423/473, 659, 396; 252/187.23, 187.24, 187.25, 187.27; 422/140, 147, 196, 227

[56] References Cited

U.S. PATENT DOCUMENTS

| | | | |
|---|---|---|---|
| 3,287,233 | 11/1966 | Aigueperse et al. | 252/187 |
| 3,582,262 | 6/1971 | Tomany | 423/241 |
| 3,870,782 | 3/1975 | Cook et al. | 423/396 |
| 3,917,475 | 11/1975 | Bergstrom | 422/227 |
| 4,094,643 | 6/1978 | Cook et al. | 423/396 |
| 4,139,601 | 2/1979 | Cook et al. | 423/659 |
| 4,234,560 | 11/1980 | Kuerten et al. | 423/659 |
| 4,238,462 | 12/1980 | Hardison | 423/659 |

FOREIGN PATENT DOCUMENTS

| | | | |
|---|---|---|---|
| 1005936 | 4/1957 | Fed. Rep. of Germany | 423/473 |
| 34-118398 | 9/1959 | Japan | 423/473 |
| 934378 | 2/1965 | United Kingdom | 423/473 |

OTHER PUBLICATIONS

Chemical Abstracts, vol. 78, No. 6, Feb. 1973, 32184q.

Primary Examiner—Gary P. Straub
Attorney, Agent, or Firm—Spencer & Frank

[57] ABSTRACT

Process and plant for the preparation of concentrated aqueous solutions of alkali metal hypochlorite, in which a suspension of crystals of alkali metal chloride in an aqueous solution of alkali metal hypochlorite is circulated from bottom to top in a tubular reaction chamber located in an enclosure, chlorine and an aqueous solution of alkali metal hydroxide are reacted in this suspension in the chamber, a fraction of the resulting suspension leaving the open upper part of the chamber, overflows out of the enclosure and is filtered to separate the crystals, and the remaining fraction of the suspension is kept in the enclosure where it is recycled to the base of the reaction chamber.

12 Claims, 1 Drawing Figure

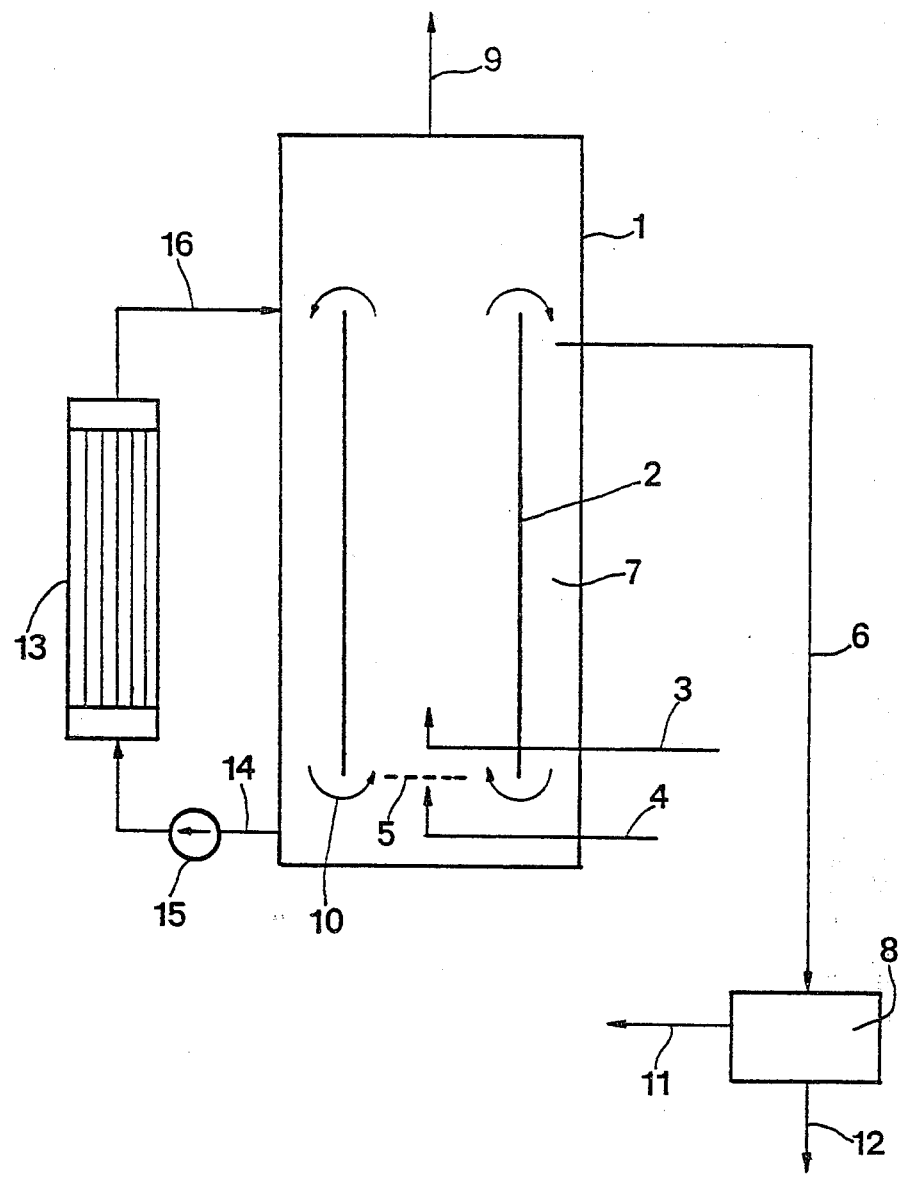

PROCESS AND PLANT FOR THE PREPARATION OF CONCENTRATED AQUEOUS SOLUTIONS OF ALKALI METAL HYPOCHLORITE

BACKGROUND OF THE INVENTION

The present invention has for its aim a process and plant for the preparation of concentrated aqueous solutions of alkali metal hypochlorite, for example sodium hypochlorite, having a strength greater than 63 chlorometric degrees.

Commercial Javel extracts are dilute aqueous solutions of sodium hypochlorite having a strength between 30 and 70 chlorometric degrees, normally between 35 and 50 chlorometric degrees.

The strength of an aqueous solution of alkali metal hypochlorite in chlorometric degrees is defined as the amount of liters of gaseous chlorine at 0° C. and 1 bar having the same oxidizing power as one liter of the solution at 20° C.

It is known that commercial Javel extracts can be prepared by reacting chlorine, possibly diluted with air, with aqueous solutions of sodium hydroxide. The resulting extracts of Javel are therefore aqueous solutions of sodium hypochlorite, containing dissolved sodium chloride, and their stability over a period of time is uncertain.

With the object of obtaining commercial Javel extracts of improved stability, it has already been proposed that there should be first produced a concentrated aqueous solution of sodium hypochlorite, having a strength of at least 70 chlorometric degrees, the said solution being then diluted to obtain the strength required for the extracts of Javel of commerce (U.S. Pat. No. 3,287,233 published on Nov. 22, 1966 and assigned to Sociéte d'électro-chimie, d'électrométallurgie et des aciéries électriques d'Ugine).

In the operation of this known process, the production of the concentrated aqueous solution of sodium hypochlorite by reaction of chlorine with the aqueous solution of sodium hydroxide is accompanied by the formation of crystals of sodium chloride which it is advisable to separate.

In general, the separation of the crystals of sodium chloride from the concentrated solution of sodium hypochlorite presents great difficulties because of their fineness.

To remove this disadvantage, it is proposed, in the U.S. patent quoted, to react chlorine and the aqueous solution of sodium hydroxide inside a fluidised bed of sodium chloride crystals, maintained by a rising circulation of an aqueous solution of sodium hypochlorite. In this way a concentrated solution of sodium hypochlorite, largely free from sodium chloride crystals, is obtained at the top of the fluidised bed, while the large crystals of sodium chloride settle out and are recovered from the bottom.

This known process for the production of concentrated aqueous solutions of sodium hypochlorite requires the use of a fluidised bed which requires high capital investment for an expensive plant which is difficult to operate.

In Chemical Abstracts, vol. 92, No. 10, March 1980, page 147, column 2, abstract No. 78993v. (Japanese patent application No. 79118398—Asahi Glass), a process is described for the production of a concentrated aqueous solution of sodium hypochlorite, wherein a dilute solution of sodium hypochlorite and sodium chloride is made to circulate from a mixing chamber where it is mixed with a concentrated solution of sodium hydroxide to a reaction chamber where the resultant mixture is treated with a gas containing chlorine. In the reaction chamber sodium hypochlorite is formed and sodium chloride crystallizes and precipitates. When the solution in the reaction chamber has achieved the selected strength in sodium hypochlorite, the process is stopped and the reaction chamber is drained to extract thereof the solution of sodium hypochlorite and the crystals of sodium chloride.

This known process has the disadvantage that it is not adapted to a continuous production of solutions of sodium hypochlorite with a constant strength.

SUMMARY OF THE INVENTION

The invention aims to remove these disadvantages of the known processes, by supplying a process for the production of aqueous solutions of alkali metal hypochlorite of high strength which allows easy separation of the crystals of sodium chloride and which can be installed in an inexpensive plant, easy and reliable to operate and allowing a continuous production of solutions of sodium hypochlorite.

The invention concerns, in consequence, a process for the preparation of concentrated aqueous solutions of alkali metal hypochlorite, wherein a suspension of crystals of alkali metal chloride in an aqueous solution of alkali metal hypochlorite is used in a reaction chamber, an aqueous solution of alkali metal hydroxide and a gas containing chlorine are introduced in the aqueous suspension and an aqueous solution of alkali metal hypochlorite and crystals of alkali metal chloride are removed out of the reaction chamber; according to the invention the gas is introduced into the lower part of the reaction chamber so as to subject the suspension to a rising displacement by gasosiphon, the suspension is drawn-off from the upper part of the reaction chamber and separated into at least two fractions, one of the fractions is recycled to the base of the reaction chamber and the aqueous solution of alkali metal hypochlorite and the crystals of alkali metal chloride are recovered separately from the other fraction.

DETAILED DESCRIPTION OF THE INVENTION

In the process according to the invention, the concentrated aqueous solutions of alkali metal hypochlorite are solutions of alkali metal hypochlorite, for example sodium or potassium hypochlorite whose available chlorine content should be high enough for their production by reaction of a gas containing chlorine with an aqueous solution of alkali metal hydroxide to be accompanied by crystallisation of alkali metal chloride.

In a general way, in the case where the process is carried out at a temperature not exceeding 50° C., for example between 25° and 35° C., a strength of 63 chlorometric degrees is the minimum value to be aimed at.

It is generally not worthwhile to allow the strength of the solution of alkali metal hypochlorite to exceed 140 chlorometric degrees because beyond this point, the stability of the solution tends to decrease rapidly.

In practice, good results are normally obtained by fixing the strength of the concentrated solution of alkali metal hypochlorite to be produced, between 70 and 140 chlorometric degrees, values between 85 and 120 chlorometric degrees being preferred.

To carry out the process according to the invention, it is possible to use pure chlorine.

It is however preferred to dilute the chlorine with another gas, so as to increase the total volume of gas in the reaction chamber and in this way to give an increase in the speed at which it rises in the said chamber.

The choice of dilution gas is made from those which do not react with chlorine or with alkali metal hydroxide in the operating conditions of the process. It can, for example, be air.

According to one particularly advantageous way of carrying out the invention, waste gas from the liquefaction of chlorine produced by the electrolysis of an alkali metal chloride brine is used. Such a waste gas usually contains, as its main constituents, chlorine, carbon dioxide and air; the partial pressure of the chlorine in this gas is usually between 5 and 10% of the total gas pressure.

The aqueous solution of alkali metal hydroxide which is reacted with chlorine in the reaction chamber may with advantage be a dilute aqueous solution containing for example 300 to 500 g of sodium or potassium hydroxide per kg, obtained by electrolysis of a substantially saturated brine of sodium or potassium chloride in a mercury cathode cell or a cell with a non porous cation-exchange membrane.

As a variant, this dilute aqueous solution of alkali metal hydroxide can be concentrated by evaporation, before being reacted with chlorine in the reaction chamber.

The upward velocity of the gas in the reaction chamber should be sufficient to ensure upward displacement of the suspension of crystals in the reaction chamber up to the point where it is drawn-off from it. It is controlled mainly as a function of its chlorine content, of the concentration of the solution of sodium hydroxide and its rate of flow into the reaction chamber, as well as the construction characteristics of said chamber.

Satisfactory results are in general obtained with velocities greater than 0.10 m/s, for example between 0.20 and 2.0 m/s. Although the gas velocity can be controlled in such a way as to allow the largest crystals of sodium chloride to settle to the bottom of the reaction chamber, a value high enough to avoid such sedimentation is nevertheless preferred.

The preferred velocities are those between 0.25 and 1.5 m/s, the best results have been obtained with velocities between 0.50 and 1 m/s. In the process according to the invention, the recycling, inside the reaction chamber, of a fraction of the suspension drawn-off from it ensures the production of crystals of alkali metal chloride which can then be separated easily and economically, from the concentrated solution of alkali metal hypochlorite.

When the process is started up, the recycling of the fraction of suspension leads to a gradual increase in crystals of alkali metal chloride in suspension and their particle size distribution then quickly becomes steady.

The ratio between the weight of the fraction of recycled suspension and the total weight of suspension drawn-off from the reaction chamber is chosen as a function of the particule size which is desired for the crystals of alkali metal chloride in the suspension drawn-off from the reaction chamber, when the process has reached steady operating conditions.

This ratio is in general greater than a minimum critical value, below which the average diameter of the crystals of alkali metal chloride in the suspension drawn-off from the reaction chamber becomes insufficient to allow their separation easily and economically.

Moreover there is for this ratio, a higher critical value, beyond which an increase in this ratio has no influence on the particle size of the crystals of alkali metal chloride in the suspension which is drawn-off from the reaction chamber.

The lower and higher critical values specified depend on a large number of factors, most important of which are the height of the reaction chamber, the rising velocity of the suspension, the chlorine content of the gas, the strength required for the concentrated solution of alkali metal hypochlorite and the choice of equipment used to separate the crystals of alkali metal chloride from the said solution. They can be determined, in each particular case by a routine laboratory test.

In general satisfactory results are obtained as soon as the weight flow of the recycled fraction is equal to at least 75% of the total weight flow of the queous suspension drawn-off from the reaction chamber. Values between 90 and 99.85% are found to be particularly advantageous, the values above 98% having given the best results.

Separation of the crystals of alkali metal chloride from the fraction of aqueous suspension which is not recycled, can be carried out by any known suitable technique, for example by filtration, by settling and decanting or by centrifuging.

According to a particular form of carrying out the invention, before treating the aqueous solution of alkali metal hydroxide with the gas in the reaction chamber, it is subjected to a pre-treatment with chlorine to form dissolved alkali metal hypochlorite. This pre-treatment is preferably controlled in such a way as to avoid crystallising the alkali metal chloride; it can be carried out with a stream of waste gas leaving the reaction chamber and still containing a little chlorine.

In the operation of the process according to the invention, the heat produced by reaction of the chlorine with the solution of alkali metal hydroxide in the reaction chamber is removed from the outside. This removal of heat can be carried out by any known means, for example by means of a jacket fitted around the reaction chamber, and through which is flowing a cooling fluid, or by means of a tubular cooler fitted inside the reaction chamber.

According to an advantageous embodiment of the process according to the invention, in order to remove at least part of the heat of reaction, the recycled fraction is cooled, before being reintroduced into the reaction chamber.

The invention also concerns a plant for the operation of the process according to invention, comprising an enclosure, a vertical column open at top and bottom ends and located in the enclosure, a pipe for the admission of a gas containing chlorine in the enclosure, a pipe for the admission of an aqueous solution of alkali metal hydroxide in the enclosure and a means for removal out of the enclosure, of crystals of alkali metal chloride and an aqueous solution of alkali metal hypochlorite, the said plant being designed in such a way that the gas inlet pipe opens into the column, near to its bottom end, and the means for the removal of the crystals and the solution of alkali metal hypochlorite comprises a pipe which opens into the enclosure and discharges into a device for separating the crystals of alkali metal chloride and the solution of alkali metal hypochlorite.

In the plant according to the invention the zone of the enclosure where the pipe for the admission of the aqueous solution of alkali metal hydroxyde emerges is preferably chosen so that the aqueous suspension leaving the top of the column is substantially free from alkali metal hydroxide.

It has been found to be particularly advantageous to lead this pipe into the column, near to the bottom end of the latter, preferably above the gas inlet pipe.

In a modified embodiment, the pipe for the admission of the aqueous solution of alkali metal hydroxide may lead into the enclosure, outside the column and below the zone where the pipe for the removal of the suspension emerges.

According to an advantageous embodiment of the invention, the plant comprises a cooler connected to the enclosure, via a pipe for removal of a fraction of the suspension from the enclosure and a pipe for the return of the said fraction into the enclosure.

The concentrated aqueous solutions of alkali metal hypochlorite obtained by means of the process and the plant according to the invention generally show good stability with time. They are normally intended to be diluted with water for the production of commercial Javel extracts having for example a strength between 30 and 50 chlorometric degrees.

Features and details of the invention will appear from the following description of the single FIGURE in the attached drawing, which shows diagrammatically, by way of example, one particular form of embodiment of the plant according to the invention.

BRIEF DESCRIPTION OF THE DRAWINGS

The plant shown in the FIGURE comprises a vertical cylindrical enclosure (1) in which is fixed an axial tubular column (2), open at both top and bottom ends.

Column (2) constitutes the actual reaction chamber in the installation; it communicates, at its lower part, with a pipe (3) for admission of an aqueous solution of alkali metal hydroxide and with a vertical pipe (4) for admission of a gas containing chlorine. A distribution grid (5) ensures even distribution of the gas in vertical threads across the horizontal section of the column (2).

A pipe (6) leads into the annular zone (7) demarcated between the lateral wall of the enclosure (1) and the column (2); it serves to drawn-off a fraction of the concentrated aqueous solution of alkali metal hypochlorite formed in the raction chamber and containing crystals of alkali metal cloride in suspension, and to transfer it into a filtration device (8) to separate the crystals of alkali metal chloride.

During the operation of the plant, the reaction chamber (2) is filled with an aqueous solution of alkali metal hypochlorite, saturated with alkali metal chloride, in which the crystals of alkali metal chloride are dispersed. This suspension is carried to the top of the reaction chamber (2), by gasosiphon under the action of the current of gas admitted by the pipe (4). Simultaneously an aqueous solution of alkali metal hydroxide is introduced in the suspension by pipe (3).

During the upward displacement of the suspension and gas in the reaction chamber (2), the chlorine gas reacts with alkali metal hydroxide to produce alkali metal hypochlorite and alkali metal chloride.

Out of the upper open end of the chamber (2), issues a concentrated aqueous solution of alkali metal hypochlorite having a strength greater than 63 chlorometric degrees and which contains crystals of alkali metal chloride in suspension. This suspension descends in the annular chamber (7), while the waste gas escapes from the apparatus by means of a pipe (9).

A fraction of the suspension overflows from the annular chamber (7) by the pipe (6) and is led to the filtration apparatus (8), while the remaining fraction (10) is recycled to the base of the reaction chamber (2).

In the filtration apparatus (8), a cake (11) of crystals of alkali metal chloride is separated and a concentrated aqueous solution of alkali metal hypochlorite (12) is recovered. This solution, having a strength greater than 63 chlorometric degrees can be diluted with water to produce a commercial Javel extract, having for example a strength of about 50 chlorometric degrees.

The plant comprises in addition an external cooler (13) connected in parallel with the annular chamber (7) via a pipe (14) and a pump (15) for extraction of a fraction of the aqueous suspension present there and a pipe (16) for recycling.

According to a modified embodiment, not shown, of the plant just described the waste gas collected in (9) is washed with the solution of alkali metal hydroxide, before being introduced into the reaction chamber (2), in order to absorb the chlorine which it might possibly contain.

The following example is intended to show the advantages of the invention.

In a plant like the one just described, an aqueous solution containing 33.5% by weight of sodium hydroxide was treated with a gas consisting of a mixture of air and chlorine and containing 5% by weight of chlorine.

The installation was supplied, via pipes (4) and (6) respectively, with hourly amounts of 2786 m$^3$ normal of gas and 1603 kg of the sodium hydroxide solution, so as to set up a rising velocity of about 0.70 to 0.80 m/s in the chamber (2). The temperature inside the latter was kept at about 30° C.

The aqueous suspension circulating from top to bottom in the annular chamber (7) was a suspension of crystals of sodium chloride in an aqueous solution of sodium hypochlorite having a strength close to 100 chlorometric degrees; it contained 11% by weight of crystals of sodium chloride.

An hourly fraction of 2051 kg of this suspension was drawn-off via pipe (6) and diverted into the filtration apparatus (8), while the balance, continued its downward circulation in the annular chamber (7) to be recycled at (10) into the reaction chamber (2).

In the filtration apparatus (8), a filter cake (11) is separated, containing, by weight, 80.1% of sodium chloride and 19.9% of sodium hypochlorite and 1775 kg per hour of an aqueous solution of sodium hypochlorite is recovered, containing, per kg, 257 g of sodium hypochlorite and 94 g of dissolved sodium chloride.

We claim:

1. In a process for the preparation of concentrated aqueous solutions of alkali metal hypochlorite according to which an aqueous solution of alkali metal hypochlorite is added with an aqueous solution of alkali metal hydroxide, the resultant liquid is treated with a gas containing chlorine and a suspension of crystals of alkali metal chloride in an aqueous solution of alkali metal hypochlorite is recovered, the improvement comprising:

continuously and simultaneously feeding both the aqueous solution of alkali metal hypochlorite and the aqueous solution of alkali metal hydroxide into a reaction chamber, continuously introducing the gas into the lower part of the reaction chamber as an upwardly gas stream in order to crystallise alkali metal chloride by reaction of chlorine of the gas with alkali metal hydroxide of the aqueous solution of alkali metal hydroxide and to subject both aqueous solutions and the suspension resulting from said reaction to upwards displacement by gasosiphon up to the upper part of the reaction chamber, continuously recovering the suspension by drawing-off out of the upper part of the reaction chamber and separating it into at least two fractions, recycling one of the fractions, outside the upwardly directed gas stream, to the base of the reaction zone, and recovering separately the concentrated aqueous solution of alkali metal hypochlorite and the crystals of alkali metal from the other fraction, the recovered crystals from said other fraction being the primary source of recovered crystals.

2. A process according to claim 1, wherein the flow rate of the recycled fraction is controlled so that it is equal to at least 98% of the flow rate of the suspension in the reaction chamber.

3. A process according to claim 1, wherein the temperature of the suspension in the reaction chamber is maintained between 25° and 35° C.

4. A process according to claim 1 wherein the gas velocity is controlled so that the upward velocity of the aqueous suspension in the reaction chamber is between 0.25 and 1.5 m/s.

5. A process according to claim 1 wherein use is made of an aqueous solution of alkali metal hydroxide containing 30 to 50% by weight of alkali metal hydroxide and of a gas having a partial pressure of chlorine between 5 and 10% of the total gas pressure.

6. A process according to claim 1 wherein the aqueous solution of alkali metal hydroxide is obtained by the electrolysis of a sodium chloride brine.

7. A process according to claim 1 wherein the aqueous solution of alkali metal hydroxide is subjected to a pretreatment of chlorination with a stream of waste gas from the reaction chamber, the quantity being controlled so as to avoid crystallisation of the alkali metal chloride.

8. A process according to claim 1, wherein the solution of alkali metal hypochlorite has a strength of from 85 to 120 chlorometric degrees.

9. A process according to claim 1, wherein the velocity of the gas is controlled to avoid allowing the largest crystals of sodium chloride to settle to the bottom of the reaction chamber.

10. A process according to claim 1, wherein the aqueous suspension drawn off contains 11% by weight of crystals of sodium chloride.

11. In a process for the preparation of concentrated aqueous solutions of alkali metal hypochlorite according to which an aqueous solution of alkali metal hypochlorite is added with an aqueous solution of alkali metal hydroxide, the resultant liquid is treated with a gas containing chlorine and a suspension of crystals of alkali metal cloride in an aqueous solution of alkali metal hypochlorite is recovered, the improvement comprising:

continuously and simultaneously feeding both the aqueous solution of alkali metal hypochlorite and the aqueous solution of alkali metal hydroxide into a tubular reaction chamber having an open upper part and located in an enclosure, continuously introducing the gas into the lower part of the reaction chamber as an upwardly directed gas stream in order to crystallise alkali metal chloride by reaction of chlorine of the gas with alkali metal hydroxide of the aqueous solution of alkali metal hydroxide and to subject both aqueous solutions and the suspension resulting from said reaction to upwards displacement by gasosiphon up to the upper part of the reaction chamber, continuously recovering the suspension by drawing-off out of the upper part of the reaction chamber and separating it into at least two fractions, recycling one of the fractions, outside the upwardly directed gas stream, and within the enclosure, to the base of the reaction zone, removing out of the enclosure the other fraction, and recovering separately the concentrated aqueous solution of alkali metal hypochlorite and the crystals of alkali metal from the removed fraction, the recovered crystals from the removed fraction being the primary source of recovered crystals.

12. Process according to claim 11, wherein the recovering is effected by filtering.

* * * * *